United States Patent
Papandreou et al.

(10) Patent No.: US 10,552,063 B2
(45) Date of Patent: Feb. 4, 2020

(54) BACKGROUND MITIGATION READS IN A NON-VOLATILE MEMORY SYSTEM

(71) Applicant: INTERNATIONAL BUSINESS MACHINES CORPORATION, Armonk, NY (US)

(72) Inventors: Nikolaos Papandreou, Thalwil (CH); Sasa Tomic, Kilchberg (CH); Roman A. Pletka, Uster (CH); Nikolas Ioannou, Zurich (CH); Charalampos Pozidis, Thalwil (CH); Aaron D. Fry, Richmond, TX (US); Timothy Fisher, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 16/014,909

(22) Filed: Jun. 21, 2018

(65) Prior Publication Data
US 2019/0391746 A1 Dec. 26, 2019

(51) Int. Cl.
*G06F 3/06* (2006.01)
(52) U.S. Cl.
CPC ............ *G06F 3/0619* (2013.01); *G06F 3/064* (2013.01); *G06F 3/0659* (2013.01); *G06F 3/0679* (2013.01)
(58) Field of Classification Search
CPC ...... G06F 3/0619; G06F 3/0659; G06F 3/064; G06F 3/0679
See application file for complete search history.

(56) References Cited

U.S. PATENT DOCUMENTS

| | | |
|---|---|---|
| 2010/0023800 A1 | 1/2010 | Harari et al. |
| 2011/0007562 A1 | 1/2011 | Yip |
| 2013/0111113 A1 | 5/2013 | Harari et al. |
| 2014/0056067 A1 | 2/2014 | Zhang et al. |

(Continued)

OTHER PUBLICATIONS

Yaakobi et al., "Error Characterization and Coding Schemes for Flash Memory", describes bit-level BER, page-level BER measurements and a proposed error correcting scheme (see section III B-C and section IV). 2010 https://cseweb.ucsd.edu/~swanson/papers/ACTEMT2010ECC.pdf.

(Continued)

*Primary Examiner* — David Yi
*Assistant Examiner* — Zubair Ahmed
(74) *Attorney, Agent, or Firm* — Brian F. Russell; Wenjie Li

(57) ABSTRACT

A controller of a non-volatile memory manages each of multiple disjoint sets of physical pages as a respective page group. The controller mitigates errors by repetitively performing background mitigation reads of each of the plurality of blocks including, in order, performing a background mitigation read of a first physical page in a first page group in a first block; prior to again performing a background mitigation read in the first block, performing a background mitigation read of a first physical page in a first page group in each other of the plurality of blocks; performing a background mitigation read of a first physical page in a second page group in the first block; and prior to again performing a background mitigation read in the first block, performing a background mitigation read of a first physical page in a second page group in each other of the plurality of blocks.

20 Claims, 8 Drawing Sheets

(56) References Cited

U.S. PATENT DOCUMENTS

2016/0110248 A1* 4/2016 Camp .................. G06F 3/0604
714/54
2016/0170672 A1   6/2016 Li et al.

OTHER PUBLICATIONS

A. Prodromakis et al., "MLC NAND Flash memory: Aging effect and chip/channel emulation", 2015, describe measuring BER (see document). https://pdfs.semanticscholar.org/8407/bf47ed375c28a05bd2bb1a9f9c8f4d00cbe3.pdf.

* cited by examiner

BACKGROUND MITIGATION READS IN A NON-VOLATILE MEMORY SYSTEM

BACKGROUND OF THE INVENTION

This disclosure relates to data processing and data storage, and more specifically, to background mitigation reads in a non-volatile memory system.

NAND flash memory is an electrically programmable and erasable non-volatile memory technology that stores one or more bits of data per memory cell as a charge on the floating gate of a transistor or a similar charge trap structure. The amount of charge on the floating gate modulates the threshold voltage of the transistor. By applying a proper read voltage and measuring the amount of current, the programmed threshold voltage of the memory cell can be determined and thus the stored information can be detected. Memories storing one, two, three and four bits per cell are respectively referred to in the art as Single Level Cell (SLC), Multi-Level Cell (MLC), Three Level Cell (TLC), and Quad Level Cell (QLC) memories.

In a typical implementation, a NAND flash memory array is organized in physical blocks (also referred to as "erase blocks") of physical memory, each of which includes multiple physical pages each in turn containing a multiplicity of memory cells. By virtue of the arrangement of the word and bit lines utilized to access memory cells, flash memory arrays have generally been programmed on a physical page basis, but erased on a physical block basis. Blocks must be erased prior to being programmed.

Because the number of blocks per die and the number of physical pages per block tend to increase with each new generation of non-volatile memory, it can be impractical or even prohibitive for a controller of numerous multi-die packages to maintain unique operating parameters for each physical page under its management. As a consequence, a controller may maintain certain metadata (e.g., read threshold voltages and/or other operating parameters) for groups of physical pages having similar characteristics rather than for individual physical pages in order to reduce the amount of metadata that must be stored.

As is well known in the art, NAND flash memory is inherently susceptible to bit errors, including error caused by program disturb effects, over-programming effects, read disturb effects, data retention (i.e., errors attributable to decay of the gate charge of programmed cells over time), and wear (i.e., errors attributable to damage to the gate dielectric due to the number of cell program/erase (P/E) cycles to which the cell is subjected). In general, the bit error rate (BER) observed for a physical page of memory that is attributable to wear is permanent and increases monotonically over the life of a NAND flash memory. Similarly, program disturb and over-programming effects can be viewed as permanent; even though they disappear after an erase operation, these two types of effects influence the BER already directly after the pages are programmed. Errors, such as those caused by read disturbs and data retention, are more transient and, although generally increasing over time, disappear by erasure of the blocks containing the affected physical pages. After a physical page is programmed, these transient effects begin to reappear gradually with increasing time and an increasing number of reads.

Data storage systems employing flash memory as a storage media generally implement flash management functions to mitigate these inherent error characteristics of flash memory. Existing systems commonly integrate at least some of these flash management functions into the data path (e.g., error correcting code (ECC) encoding and RAID-like data protection schemes), while other flash management functions operate in the background independently of any external (i.e., host) requests for the data stored in the flash memory. Examples of background flash management functions common in enterprise-class flash arrays include read sweeping, which entails reading individual physical pages to detect and correct bit errors, wear leveling, which seeks to equalize the P/E cycle counts for all physical pages, and calibration, which conventionally determines appropriate read threshold voltages on a block-by-block basis.

BRIEF SUMMARY

The present application also appreciates that some newer non-volatile memory technologies may also have additional transient operating states in which a physical page of memory may exhibit an elevated BER. For example, a physical page of three-dimensional (3D) NAND flash memory may experience effects from static electric charge build up when a block is not read for a certain amount of time resulting in a temporarily elevated BER. Hence, when the physical page is first read after a relatively short (e.g., on the order of second to minutes) time interval elapsing without a read being made to the block containing that physical page, the apparent voltages of the memory cells comprising the physical page may not correspond to the programmed voltages and the measured BER may therefore be higher than another read to the same physical page under different conditions where reads to the block containing the physical page occurred recently. This higher BER not only falsifies the observed wear, but also may result in a situation where the error correcting code (ECC) implemented to protect the integrity of the data cannot correct the large number of bit errors. A physical page of 3D NAND flash memory may similarly exhibit a different apparent voltage and thus a temporarily elevated BER for other reasons, such as erase disturbs (e.g., multiple consecutive block erases being performed in one or more blocks that are physically related to the block of the target page (e.g., they belong to the same plane) without any intervening read to the target block), read disturbs (e.g., multiple consecutive reads in one or more blocks that are physically related to the block of the target page (e.g., they belong to the same plane) without any intervening read to the target block), etc.

Regardless of the cause, an operating state of a physical page (or other memory unit) exhibiting an apparent voltage different from its programmed voltage and thus a temporarily elevated BER is referred to herein as being in a Higher BER State (FIBS). This condition can generally be mitigated by performing a read (hereinafter referred to as a "mitigation read") of any page of the block containing the physical page. For example, in a typical operating scenario, after reading one or more physical pages from a block in a HBS and waiting for some finite amount of time (e.g., 100 ms to seconds), the block (and the physical pages it contains) transitions from the HBS into a Lower BER State (LBS) in which the observed BER returns to a lower value that accurately reflects the long-term effects of wear on the block.

In view of the foregoing, in at least one embodiment, a controller of a non-volatile memory implements a number of background management functions to mitigate bit errors. In a preferred embodiment, the controller reduces the volume of metadata that must be stored by managing each of multiple disjoint sets of physical pages in the non-volatile memory as a respective multi-page page group. As part of its background management functions, the controller mitigates errors by repetitively performing background mitigation reads of each of the plurality of blocks, including, in order, performing a background mitigation read of a first physical page in a first page group in a first block; prior to again performing a background mitigation read in the first block, performing a background mitigation read of a first physical page in a first page group in each other of the plurality of blocks; performing a background mitigation read of a first physical page in a second page group in the first block; and prior to again performing a background mitigation read in the first block, performing a background mitigation read of a first physical page in a second page group in each other of the plurality of blocks. Thus, in this background read process, the controller performs a background read to each block holding valid data prior to again performing a background read from the same block, and performs a background read to each page group prior to again performing a background read from the same page group.

In at least one embodiment, this mitigation read process ensures that a background mitigation read is performed to each in-use block managed by the controller within a predetermined time period.

DETAILED DESCRIPTION

Figure 1A:
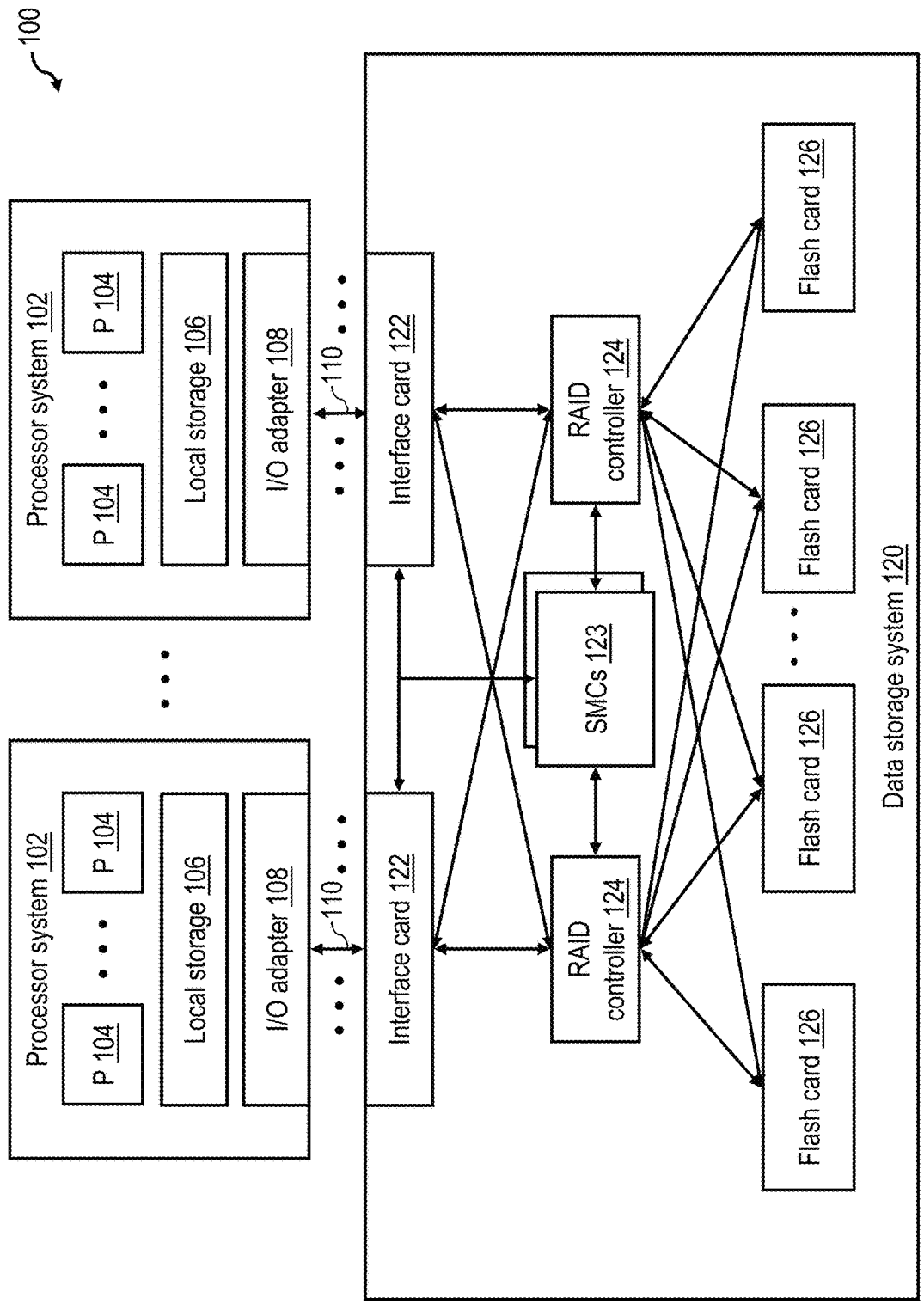
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, POWER, Intel x86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In some embodiments, data storage system 120 may be integral to a processor system 102. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O requests communicated via I/O channel 110 include host read requests by which a processor system 102 requests data from data storage system 120 and host write requests by which a processor system 102 requests storage of data in data storage system 120.

Although not required, in the illustrated embodiment, data storage system 120 includes multiple interface cards 122 through which data storage system 120 receives and responds to I/O requests of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to non-volatile storage media, which in the illustrated example include multiple flash cards 126 bearing NAND flash memory. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1B:
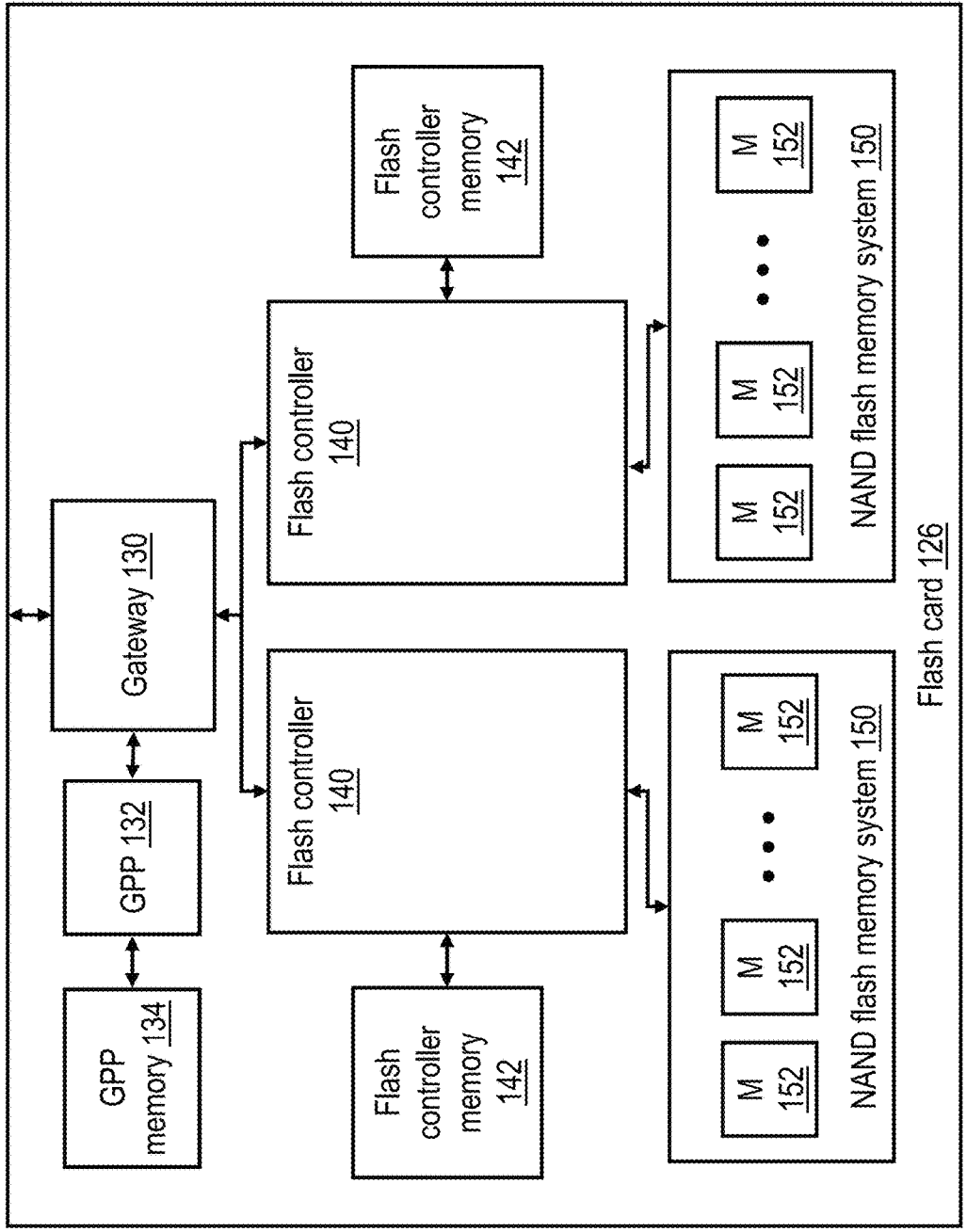
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on requests received by gateway 130 and/or to schedule servicing of the requests by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive host read and write requests from gateway 130 that request to read data stored in NAND flash memory system 150 and/or to store data in NAND flash memory system 150. Flash controllers 140 service these requests, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, a request received by flash controller 140 from a host device, such as a processor system 102, contains the logical block address (LBA) at which the data is to be accessed (read or written) and, if a write request, the write data to be stored to data storage system 120. The request may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Multi-Level Cell (MLC), Three Level Cell (TLC), or Quad Level Cell (QLC) NAND flash memory modules. The effective storage capacity provided by flash memory storage devices 152 can be increased through the implementation of data compression, for example, by flash controllers 140 and/or high level controllers, such as GPPs 132, RAID controllers 124 or SMCs 123.

Figure 2:
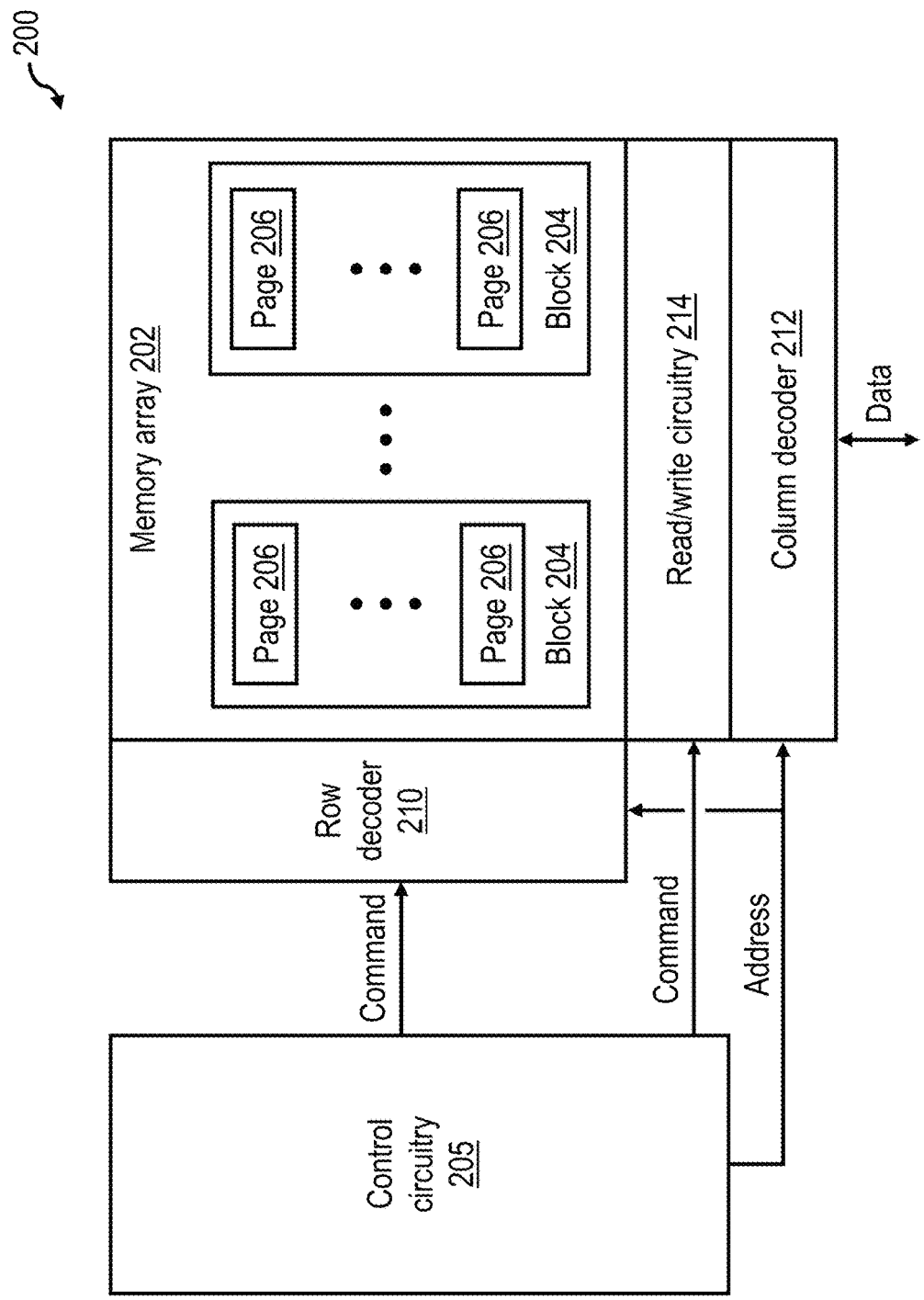
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two-dimensional or three-dimensional array of NAND flash memory cells. As indicated in FIG. 2, the memory cells within memory array 202 are physically arranged in multiple blocks 204, each in turn including multiple physical pages 206. These physical pages can be managed in page groups, which can each be formed, for example, of all the pages coupled to a common wordline, of all pages of the same type (e.g., pages storing the bit of the same significance usually referred to as lower pages, upper pages, extra pages, etc.) across all word lines in one or more layers in a 3D NAND flash, of a set of pages in one or more layers, or generally of physical pages with similar characteristics.

As is known to those skilled in the art, NAND flash memory, such as that employed in memory array 202, must be erased prior to being programmed. Further, NAND flash memory can be (but is not required to be) constrained by its construction such that the smallest granule of storage that can be erased is a block 204 and the smallest granule of storage that can be accessed by a read or write request is fixed at the size of a single physical page 206. It should be appreciated in this regard that the LBAs provided by host devices correspond to logical pages within a logical address space, where each logical page typically has a size of 4 kilobytes (kB). Physical pages 206, in contrast, typically have a larger size, for example, 16 kB, and can thus store multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3, which is a high level flow diagram of the flash management functions and data structures employed by a GPP 132 and/or flash controller 140 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from logical block addresses (LBAs) within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation for an associated set of LBAs using a logical-to-physical address translation data structure, such as logical-to-physical translation (LPT) table 300, which can be stored, for example, in the associated flash controller memory 142. It should be noted that the logical address supplied to flash controller(s) 140 may be different from the logical address originally supplied to data storage system 120, since various components within data storage system 120 may perform address translation operations between the external devices and the flash controller(s) 140.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus), and an identifier of each erased block that is to be reused is enqueued in the RTU queue 306 corresponding to its channel. A build block stripes function 320 performed by flash management code running on the GPP 132 constructs new block stripes for storing data and associated parity information from the erased blocks enqueued in RTU queues 306. The new block stripes are then queued to the flash controller 140 for data placement. Block stripes are preferably formed of one or more physical blocks residing in different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life). Because all of the physical block(s) composing a block stripe are generally managed together as a unit for programming and erasure, a block stripe is also referred to in the art as a logical erase block (LEB).

In response to write request received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that the associated data is no longer valid. In addition, data placement function 310 allocates a page stripe if necessary to store the write data of the write request and any non-updated data (i.e., for write requests smaller than a logical page, the remaining valid data from a previous write to the same logical address which is not being overwritten and which must be handled in a read-modify-write manner) from an existing page stripe, if any, targeted by the write request, and/or stores the write data of the write request and any non-updated (i.e., still valid) data from an existing page stripe, if any, targeted by the write request to an already allocated page stripe which has free space left. The page stripe may be allocated from either a block stripe already allocated to hold data or from a new block stripe built by build block stripes function 320. In a preferred embodiment, the page stripe allocation can be based on the health of the blocks available for allocation and the "heat" (i.e., estimated or measured write access frequency) of the LBA of the write data. Data placement function 310 then writes the write data, associated metadata (e.g., cyclic redundancy code (CRC) and error correcting code (ECC) values), and parity information for the page stripe in the allocated page stripe. Flash controller 140 also updates LPT table 300 to associate the physical page(s) utilized to store the write data with the LBA(s) indicated by the host device. Thereafter, flash controller 140 can access the data to service host read requests by reference to LPT table 300 as further illustrated in FIG. 3.

Once programming of physical pages in a block stripe has closed, flash controller 140 places an identifier of the block stripe into one of occupied block queues 302, which flash management code running on the GPP 132 utilizes to facilitate garbage collection. As noted above, through the write process, logical pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular block stripes for garbage collection based on a number of factors including, for example, the health of the physical blocks 204 within the block stripes, the amount of dummy data (if any) in the block stripes, and how much of the data within the erase blocks 204 is invalid. In the illustrated example, garbage collection is performed on entire block stripes (or LEBs), and flash management code running on GPP 132 logs identifiers of the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the data held in block stripes enqueued in relocation queue 304. To relocate such data, relocation function 314 issues relocation write requests to data placement function 310 to request that the valid data of the old block stripe be written to a new block stripe in NAND flash memory system 150. In addition, relocation function 314 updates LPT table 300 to remove the current association between the logical and physical addresses of the data. Once all remaining valid data has been moved from the old block stripe, the old block stripe is passed to dissolve block stripes function 316, which decomposes the old block stripe into its constituent physical blocks 204, thus disassociating the physical blocks 204. Each of the physical blocks 204 formerly forming the dissolved block stripe is then erased under the direction of flash controller 140 and/or the control circuitry 205 of the relevant flash memory module 200, and a corresponding program/erase (P/E) cycle count 334 for each erased block is incremented. Based on the health metrics of each erased block 204 (e.g., bit error rate (BER) metrics, uncorrectable errors, P/E cycle count, etc.), each erased block 204 is either retired (i.e., withdrawn from use) by a block retirement function 318 among the flash management functions executed on GPP 132, or alternatively, prepared for reuse by placing the block 204 on the appropriate ready-to-use (RTU) queue 306 in the associated GPP memory 134.

Figure 3:
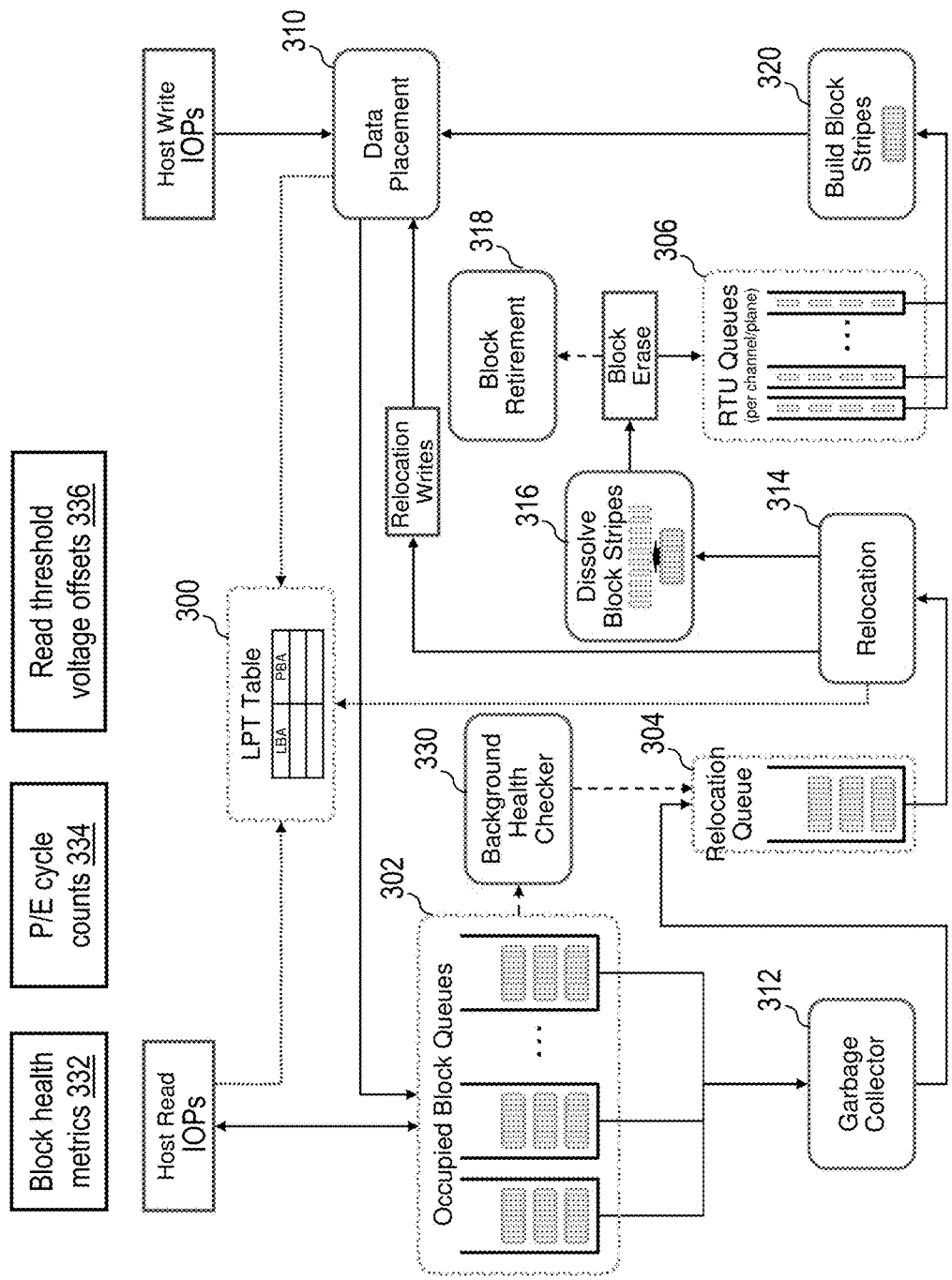
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the read and write requests of hosts such as processor systems 102, continuously determines one or more block health metrics 332 for physical blocks 204 belonging to block stripes recorded in occupied block queues 302. Based on the one or more of the block health metrics 332, a wear leveling function within background health checker 330 places block stripes on relocation queue 304 for handling by relocation function 314. Key block health metrics 332 preferably monitored and recorded by background health checker 330 relate to the bit error rate (BER) metrics observed for valid blocks and physical pages, and may include, for example, the worst page BER of each block and page group, the mean page BER of each block, the rates of change of the worst page BER and mean page BER of each block, etc. In order to obtain the most accurate health estimate possible, a health grade can be determined from an analysis of valid and invalid data, thereby ensuring that blocks containing almost entirely invalid data are fully analyzed to determine overall block health.

Figure 4:
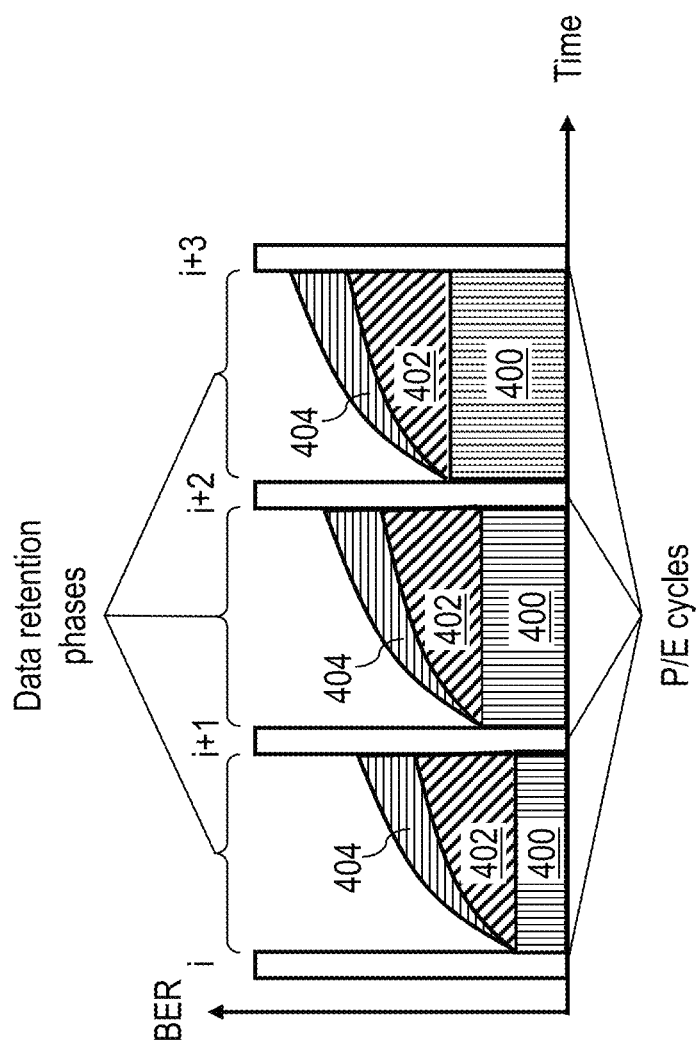
FIG. 4 is a graph of bit error rate (BER) of a physical block of NAND flash memory over time.

Referring now to FIG. 4, a graph of bit error rate (BER) over time is given for a typical physical page 206 in a physical block 204 of NAND flash memory. A very similar behavior can be observed for the worst page 206 in a physical block 204 or for the average BER of all pages 206 in a block 204. In the graph, a number of program/erase (P/E) cycles i, i+1, i+2, i+3, . . . , in which the physical page 206 is first erased and then programmed, are shown. Between chronologically adjacent P/E cycles, the physical page 206 is in a data retention phase in which the data programmed into the cells of the physical page 206 is retained.

During each P/E cycle, the data programmed within physical page 206 is subject to a BER including at least three components, namely, a first component 400 attributable to wear, program disturb effects, and over-programming effects, a second component 402 attributable to data retention effects, and a third component 404 attributable to read disturb effects. As shown, the first component 400 of the BER is permanent and increases monotonically over the useful lifetime of the physical page 206. However, the second component 402 and third component 404 of the BER are transient and, although generally higher at the end of each succeeding data retention phase, are reduced between the end of one data retention phase and the beginning of the next data retention phase by the erasure performed in the intervening P/E cycle. Even though program disturbs and over-programming effects disappear after an erase operation, they are considered as being permanent effects for the following reasons. First, program disturb effects, sometimes also denoted as cell-to-cell program interference, occur when one or more bits in adjacent cells not intended to be programmed are changed during a cell program operation due to parasitic capacitance coupling between these cells. Second, over-programming, also denoted as program interference or program errors due to two-step programming, occurs during a first programming step, when a threshold voltage in a cell on a bitline within a block is incorrectly programmed to a too high value. This results in the cell not being read correctly upon the second programming step and thus in incorrect programming of subsequent pages on the same wordline within the block. Hence, these two effects influence the BER immediately after the pages are programmed and can only be distinguished from other effects by a detailed analysis of all errors in all pages on the same wordline. Therefore, program disturbs and over-programming effects are considered herein as being permanent effects.

Components 400, 402, and 404 of the overall BER, which are attributable to wear, retention, and disturb and programming effects, generally affect all similar physical pages of a physical block similarly. Consequently, the collection of these subsets of similar physical pages into different multi-page page groups enables a controller to mitigate bit errors of all pages within each page group by implementing an appropriate mitigation strategy for each page group.

As described above, to manage the BER of physical pages 206 and thus extend the useful lives of flash memory storage devices 152, flash controller 140 and/or GPP 132 perform a number of different background management functions. These background management functions, which can be incorporated into the operation of background health checker 330 in at least some embodiments, include read scrubbing, read threshold voltage calibration, and periodically performing mitigation reads to switch blocks from a transient high BER state (HBS) to a low BER state (LBS). Read scrubbing involves the controller performing a background read of some or all physical pages in all blocks under its control and detecting the page error counts obtained by the background read operations. Depending on the observed page error counts and possibly other factors, the controller may selectively perform one or more additional management functions, such as updating block health metrics 332, queuing a page group or block for an on-demand read threshold voltage calibration, relocating one or more logical pages of data, etc. If invoked, read threshold voltage calibration entails the controller adjusting one or more read threshold voltages utilized to distinguish between bit values programmed into the memory cells.

As described in detail below, the background management functions of read scrubbing, read threshold voltage calibration, and performing mitigation reads can be implemented in a unified background management process, which can guarantee that a background read is performed within a maximum refresh period, while reducing the volume of background reads (and the concomitant read disturb effects).

Figure 5:
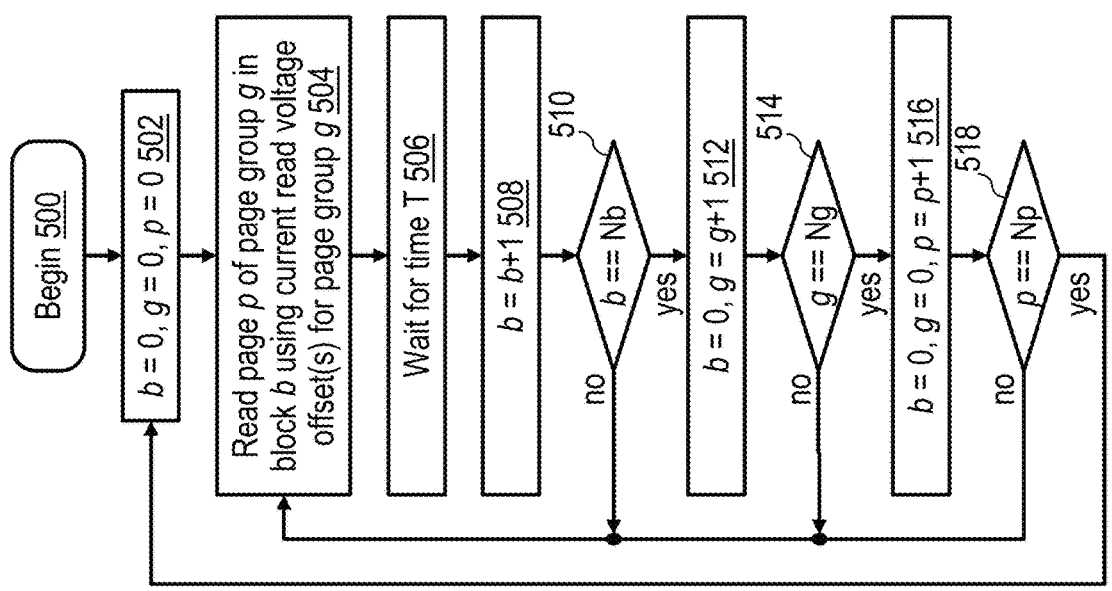
FIG. 5 is a high level logical flowchart of an exemplary process for mitigating errors in a non-volatile memory in accordance with a first embodiment.

With reference now to FIG. 5, there is illustrated a high level logical flowchart of an exemplary process for mitigating errors in a non-volatile memory in accordance with a first embodiment. The illustrated process (and those given in FIGS. 7-8) may be performed, for example, in hardware, software, firmware, and/or a combination thereof by flash controller 140 and/or GPP 132, each or both of which may be referred to herein generally as a "controller."

The process of FIG. 5 begins at block 500 and then proceeds to block 502, which illustrates the controller initializing three process variables, b, g, and p, which respectively specify indices for a block among the Nb blocks containing valid data, a page group among the Ng page groups within each block, and a physical page among the Np physical pages within each page group. Note that Np may vary for different page groups without altering the spirit and scope of the invention. The values of the block and physical page indices need not match the block identifier (ID) and physical page IDs utilized by the controller, for example, in LPT table 300. The process proceeds from block 502 to block 504 and following blocks, which illustrate the controller repetitively performing background reads to each valid data block, page group, and physical page under its control, cycling first through each valid data block, then each page group, and then each physical page.

Referring first to block 504, the controller performs a background read of physical page p of page group g in block b utilizing the relevant per-page group read threshold voltage offset(s) 336 applicable to page group g. In a preferred embodiment in which all physical pages in a page group are of the same type (e.g., lower pages, upper pages, extra pages, etc.), the background read uses the same read threshold voltages when reading all physical pages in the page group. This background read serves as a background mitigation read in that it temporarily restores all physical pages in block b from the HBS to the LBS. As part of performing the background read of physical page p, the controller also detects the error count for physical page p, which, as noted above, can be used by background health checker 330 to update one or more block health metrics 332 for block b.

Following the background read performed at block 504, the controller waits for a time T prior to performing a subsequent background read (block 506). In various embodiments, time T can be defined according to device characteristics, the number of blocks managed by the controller, the number of blocks storing valid data, and other system requirements. For example, time T can be defined such that T*Nb=3 minutes. Because time T determines the cycle time for background reads to each block, the illustrated method guarantees that each block holding valid data is read at least every T*Nb minutes, each page group is read every T*Nb*Ng minutes, and each physical page is read every T*Nb*Ng*Np minutes. The controller then increments block index b (block 508) and determines whether or not block index b equals Nb, indicating that the controller has performed a background read from all Nb blocks holding valid data (block 510). If not, the process returns iteratively to blocks 504-508, which have been described. If, however, the controller determines at block 510 that a background read has been performed to each of the Nb blocks holding valid data, the process proceeds to block 512.

At block 512, the controller resets block index b to 0 and advances page group index g. The controller then tests at block 514 whether or not page group index g is equal to Ng, signifying that a background read operation has been made to each page group in all blocks holding valid data. If not, the process returns iteratively to blocks 504-512, which have been described. If, however, the controller determines at block 512 that a background read has been performed to each of the Ng page groups, the process proceeds to block 516.

At block 516, the controller resets block index b and page group index g to 0 and advances page index p. The controller then tests at block 518 whether or not page index p is equal to Np, signifying that a background read operation has been made to each page in each page group in all blocks holding valid data. If not, the process returns iteratively to blocks 504-516, which have been described. If, however, the controller determines at block 518 that a background read was completed for each physical page in each page group of each block holding valid data, the process has finished a complete cycle through all physical pages of the valid blocks under its control, and the process returns to block 502 and following blocks to begin a subsequent cycle.

Figure 6:
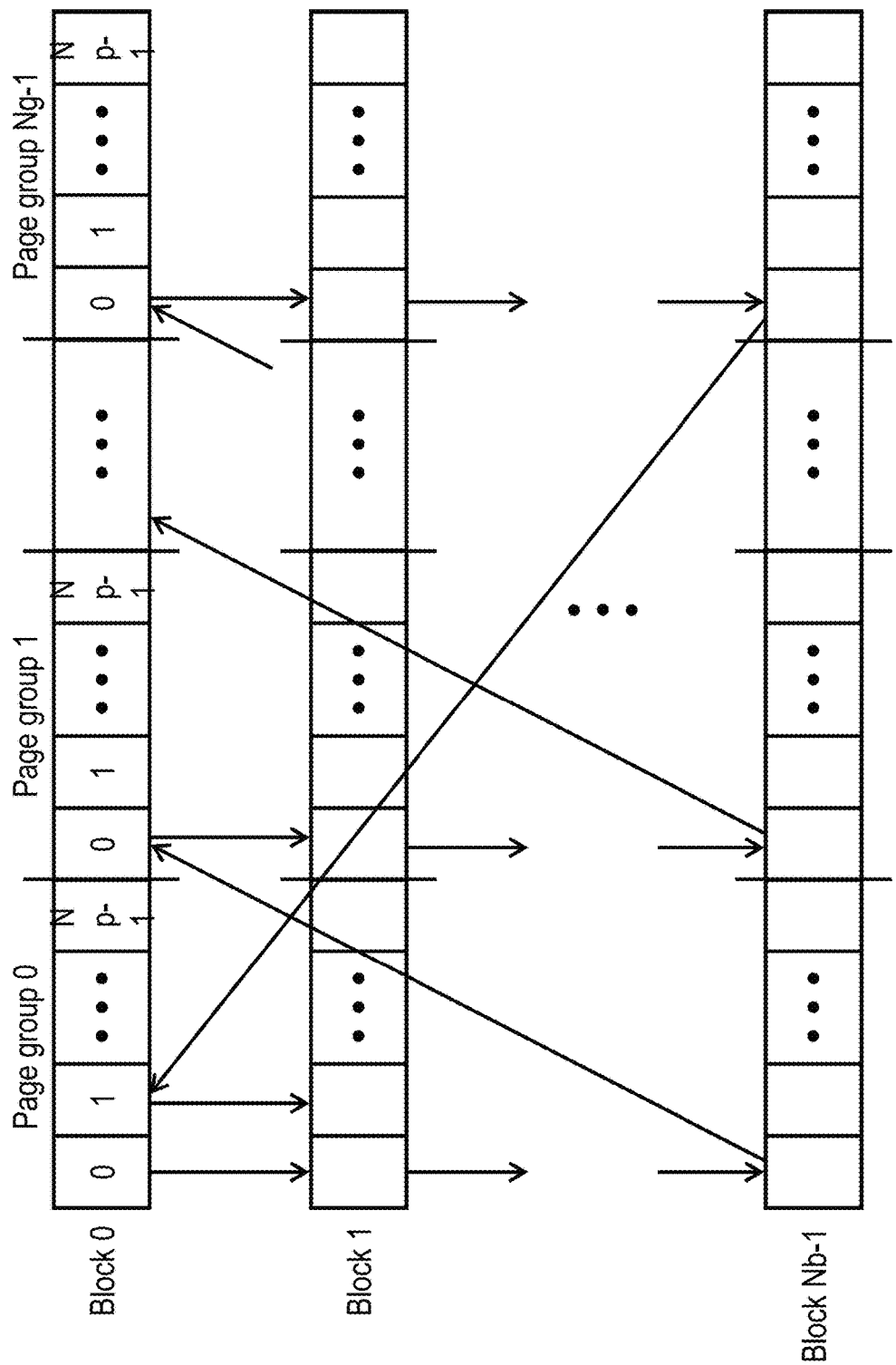
FIG. 6 illustrates the sequence in which background reads are performed in accordance with the first embodiment given in FIG. 5.

Referring now to FIG. 6, the sequence in which background reads are performed in accordance with the first embodiment given in FIG. 5 is depicted. As shown, the controller first performs a background read of the first physical page (p=0) of the first page group (g=0) of each of Nb blocks holding valid data by iteratively updating block index b. The controller then updates the page group index g and performs a background read of the first physical page (p=0) of the second page group (g=1) of each of Nb blocks holding valid data. This process is repeated for each successive page groups until a background read has been made to the first physical page in each of the Ng page groups in each of the Nb blocks. The controller then updates the page index p and returns to the second physical page (p=1) of the first page group in each of the Nb blocks. This process continues until the controller has performed a background read of all Np pages of all page groups Ng of the Nb blocks holding valid data. In case Np is not equal for all page groups, once all pages in a particular page group have been read in the current iteration, the process simply skips that page group and continues with the next page group. As should be appreciated, the process given in FIG. 5 (and the alternative embodiments depicted in FIGS. 7-8) differs significantly from prior art management processes that typically cycle through memory in ascending (rather than descending) order of size of memory unit. It should be noted that the sequence of pages within each page group g (i.e., page 0, page 1, . . . , page Np−1), and the sequence of pages within each block b (i.e., page 0, page 1, . . . , page Np−1 of page group 0; page 0, page 1, . . . , page Np−1 of page group 1; or page 0, page 1, . . . , page Np−1 of page group Ng−1) illustrated in FIG. 6 correspond to a logical page sequence of the pages within each page group and page groups within each block and not to a physical sequence determined by the page addresses within a block.

Figure 7:
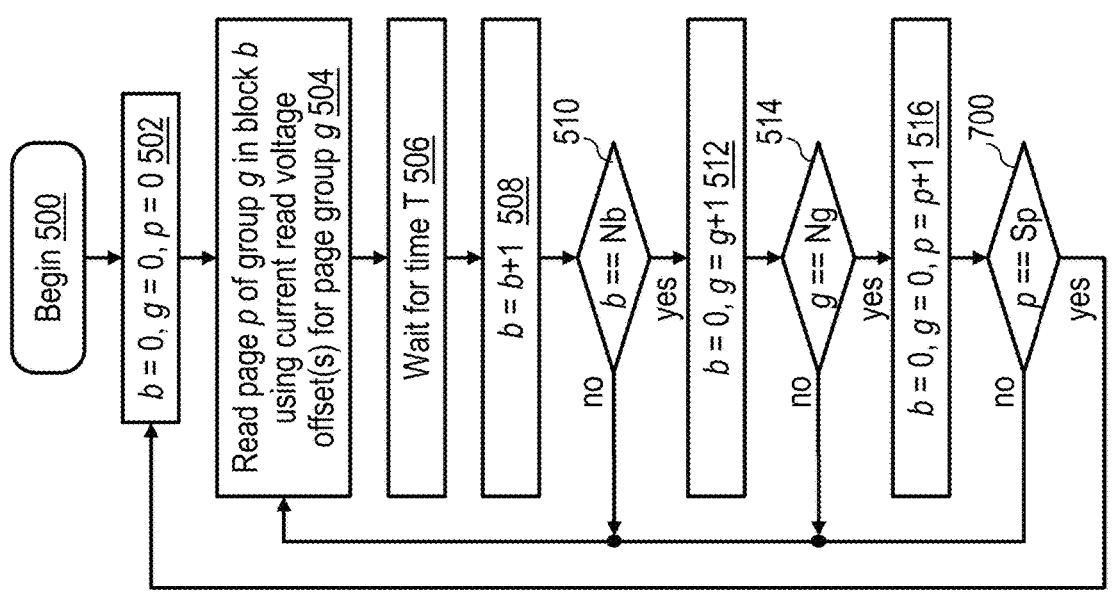
FIG. 7 is a high level logical flowchart of an exemplary process for mitigating errors in a non-volatile memory in accordance with a second embodiment.

With reference now to FIG. 7, there is illustrated a high level logical flowchart of an exemplary process for mitigating errors in a non-volatile memory in accordance with a second embodiment. As indicated by like reference numbers, the process of FIG. 7 is the same as that shown in FIG. 5, except that new block 700 replaces block 518. In this second embodiment, rather than iterating through all Np physical pages in the blocks holding valid data, the controller iterates through only a subset of the physical pages in each page group, where the number of physical pages in the subset (Sp) is less than Np. By reducing the number of physical pages to which background reads are performed, the monitoring period for each physical page is reduced to T*Nb*Ng*Sp minutes.

In some implementations, the controller may select the subset of Sp pages in each page group to which background reads are performed based on which physical pages are more susceptible to bit errors. This information can be determined, for example, based on off-line characterization data, on-line characterization data, block state information, etc. Note that the number of pages in each subset Sp may vary for different page groups.

In some implementations, the controller may read the same subsets of sample pages for a predetermined or dynamically determined number of monitoring cycles. The controller may then perform a background read of all physical pages in all page groups as shown in FIG. 5, select a new subset of Sp pages in each page group based on the observed BERs over all Np physical pages, and return to monitoring the new subset of Sp pages for a predetermined or dynamically determined number of monitoring cycles.

In some implementations, the controller may select the subset of Sp pages in each page group pseudo-randomly. For example, the controller may pseudo-randomly select a single value of page index p from the set {0 . . . Np−1} at block 502 of FIG. 7 and only perform a background read to the identified physical page in all page groups and all blocks. Alternatively, the pseudo-random selection may be skewed to perform more background read operations to physical pages and/or page groups that are more susceptible to bit errors.

Figure 8:
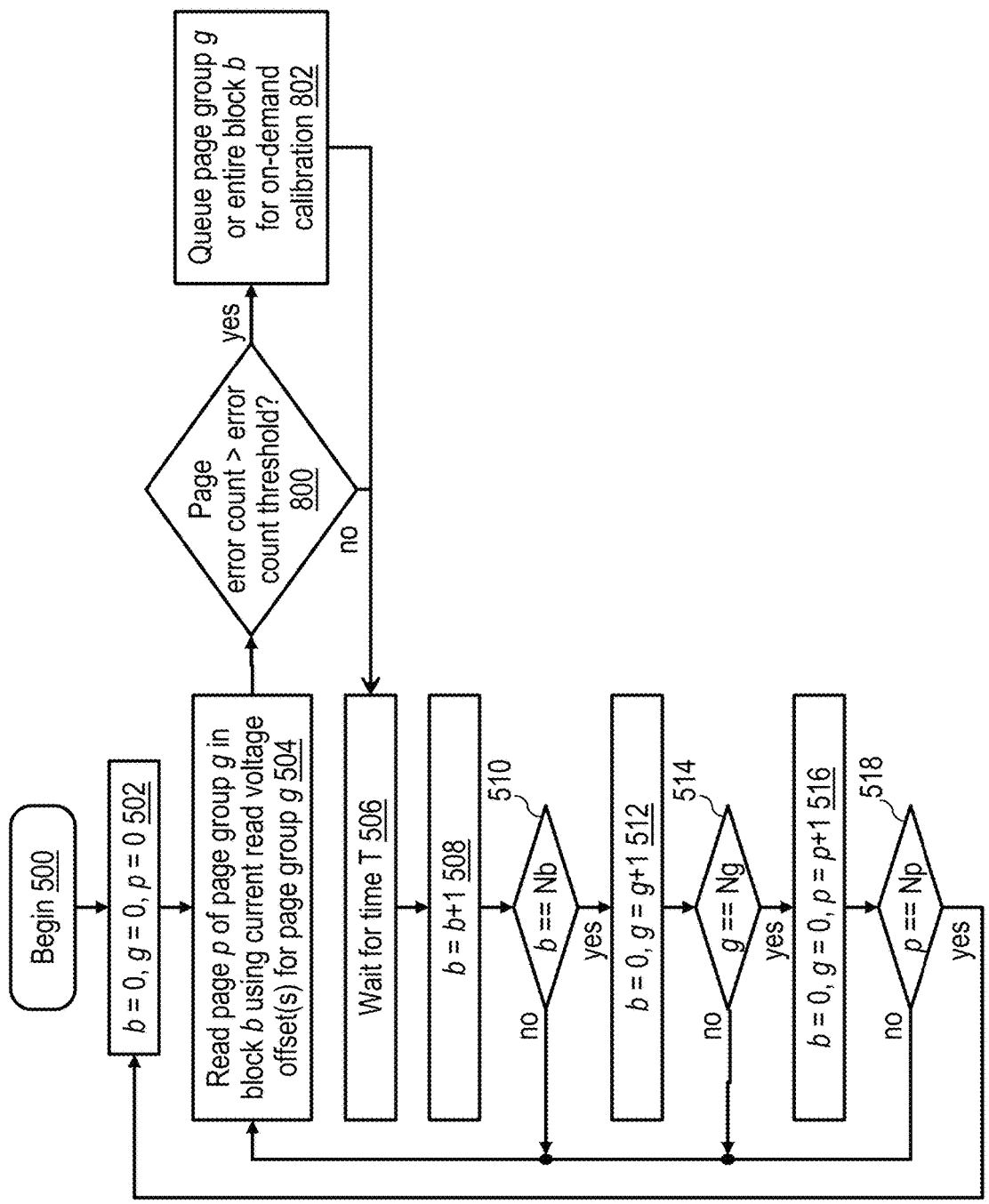
FIG. 8 is a high level logical flowchart of an exemplary process for mitigating errors in a non-volatile memory in accordance with a third embodiment.

Referring now to FIG. 8, there is depicted a high level logical flowchart of an exemplary process for mitigating errors in a non-volatile memory in accordance with a third embodiment. As indicated by like reference numbers, the process of FIG. 8 is the same as that shown in FIG. 5, except for the inclusion of new blocks 800-802 between blocks 504 and 506.

At block 800 of FIG. 8, the controller determines whether or not the error count observed for page p in the background read performed at block 504 exceeds an error count threshold. The error count threshold may be individually determined for each block and may be adapted by the controller according to the operating conditions of the block, e.g., P/E cycle count, read disturb, data retention, etc. In response to the controller determining at block 800 that the error count observed for page p does not exceed the error count threshold, the process passes from block 800 to block 506, which has been described. If, however, the controller determines at block 800 that the error count observed for page p exceeds the relevant error count threshold, the controller queues either the current page group g or the entire block b for on-demand calibration of the relevant read threshold voltages, as shown at block 802. As will be appreciated, this on-demand calibration can be utilized to complement and provide a more immediate calibration than that provided by a regular periodic calibration of each block.

Other variations of the disclosed embodiments are contemplated. For example, in some embodiments, the controller may elect to skip performing a background read to a given block b if a physical page of that block was recently read by another read operation, such as a host read or a read performed in conjunction with periodic calibration of the block. As will be appreciated, skipping a block reduces the volume of background reads and the cycle time of the background read process. Further, in some embodiments, on-demand calibration, such as that invoked at block 802 of FIG. 8, can calibrate only one or a subset of physical pages in a page group and then apply the read threshold voltage offsets determined during calibration to all the physical pages in the page group. Because such calibration operates on a very limited number of pages, it can be performed very quickly utilizing a small set of background reads, thus reducing any associated read disturb effects. Although using such a limited set of pages to determine read threshold voltage offsets can lead to offset values that are sub-optimal for the page group, this result can be ameliorated to a large extent by grouping physical pages with similar characteristics.

As has been described, in at least one embodiment, a controller of a non-volatile memory manages each of multiple disjoint sets of physical pages as a respective page group. The controller mitigates errors by repetitively performing background mitigation reads of each of the plurality of blocks including, in order, performing a background mitigation read of a first physical page in a first page group in a first block; prior to again performing a background mitigation read in the first block, performing a background mitigation read of a first physical page in a first page group in each other of the plurality of blocks; performing a background mitigation read of a first physical page in a second page group in the first block; and prior to again performing a background mitigation read in the first block, performing a background mitigation read of a first physical page in a second page group in each other of the plurality of blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of mitigating errors in a non-volatile memory having a plurality of blocks each including a plurality of physical pages of memory, the method comprising:
    a controller of the non-volatile memory managing each of multiple disjoint sets of the plurality of physical pages as a respective page group, wherein each of the page groups includes multiple physical pages; and
    the controller mitigating errors in the non-volatile memory by repetitively performing background mitigation reads from each of the plurality of blocks, wherein repetitively performing background mitigation reads includes, in order:
        performing a background mitigation read of a first physical page in a first page group in a first block;
        prior to again performing a background mitigation read in the first block, performing a background mitigation read of a first physical page in a first page group in each other of the plurality of blocks;
        performing a background mitigation read of a first physical page in a second page group in the first block; and
        prior to again performing a background mitigation read in the first block, performing a background mitigation read of a first physical page in a second page group in each other of the plurality of blocks.

2. The method of claim 1, wherein repetitively performing background mitigation reads comprises:
    after performing a background mitigation read of a first physical page in each of the plurality of page groups, the controller performing a background mitigation read of a second physical page in the first page group in the first block.

3. The method of claim 1, wherein repetitively performing background mitigation reads comprises the controller performing a background mitigation read directed to each of the plurality of blocks within a predetermined time period.

4. The method of claim 1, wherein repetitively performing background mitigation reads comprises:
    in a given cycle of performing background mitigation reads to all page groups, the controller performing background mitigation reads of only a subset of physical pages in each page group.

5. The method of claim 4, and further comprising the controller selecting as the subset one or more physical pages more susceptible to errors than other physical pages in a same page group.

6. The method of claim 4, and further comprising the controller randomly selecting as the subset one or more physical pages in a same page group.

7. The method of claim 1, and further comprising:
    in response to a background mitigation read of a particular physical page resulting in errors exceeding a threshold, the controller calibrating read voltage thresholds for at least a page group including the particular physical page.

8. The method of claim 1, and further comprising:
    in response to a background mitigation read of a particular physical page resulting in errors exceeding a threshold, the controller calibrating read voltage thresholds for one or more page groups based upon only a subset of physical pages in each page group selected for calibration.

9. A data storage system, comprising:
a controller for a non-volatile memory, wherein the controller is configured to perform:
managing each of multiple disjoint sets of the plurality of physical pages as a respective page group, wherein each of the page groups includes multiple physical pages; and
mitigating errors in the non-volatile memory by repetitively performing background mitigation reads from each of the plurality of blocks, wherein repetitively performing background mitigation reads includes, in order:
performing a background mitigation read of a first physical page in a first page group in a first block;
prior to again performing a background mitigation read in the first block, performing a background mitigation read of a first physical page in a first page group in each other of the plurality of blocks;
performing a background mitigation read of a first physical page in a second page group in the first block; and
prior to again performing a background mitigation read in the first block, performing a background mitigation read of a first physical page in a second page group in each other of the plurality of blocks.

10. The data storage system of claim 9, wherein repetitively performing background mitigation reads comprises:
after performing a background mitigation read of a first physical page in each of the plurality of page groups, the controller performing a background mitigation read of a second physical page in the first page group in the first block.

11. The data storage system of claim 9, wherein repetitively performing background mitigation reads comprises the controller performing a background mitigation read directed to each of the plurality of blocks within a predetermined time period.

12. The data storage system of claim 9, wherein repetitively performing background mitigation reads comprises:
in a given cycle of performing background mitigation reads to all page groups, the controller performing background mitigation reads of only a subset of physical pages in each page group.

13. The data storage system of claim 12, wherein the controller is further configured to select as the subset one or more physical pages more susceptible to errors than other physical pages in a same page group.

14. The data storage system of claim 12, wherein the controller is further configured to randomly select as the subset one or more physical pages in a same page group.

15. The data storage system of claim 9, wherein the controller is further configured to perform:
in response to a background mitigation read of a particular physical page resulting in errors exceeding a threshold, the controller calibrating read voltage thresholds for at least a page group including the particular physical page.

16. The data storage system of claim 9, and further comprising the non-volatile memory.

17. A computer program product, the computer program product comprising a computer readable storage medium having program instructions embodied therewith, the program instructions being executable by a controller of a non-volatile memory to cause the controller to perform:
managing each of multiple disjoint sets of the plurality of physical pages as a respective page group, wherein each of the page groups includes multiple physical pages; and
mitigating errors in the non-volatile memory by repetitively performing background mitigation reads from each of the plurality of blocks, wherein repetitively performing background mitigation reads includes, in order:
performing a background mitigation read of a first physical page in a first page group in a first block;
prior to again performing a background mitigation read in the first block, performing a background mitigation read of a first physical page in a first page group in each other of the plurality of blocks;
performing a background mitigation read of a first physical page in a second page group in the first block; and
prior to again performing a background mitigation read in the first block, performing a background mitigation read of a first physical page in a second page group in each other of the plurality of blocks.

18. The data storage system of claim 17, wherein repetitively performing background mitigation reads comprises:
after performing a background mitigation read of a first physical page in each of the plurality of page groups, the controller performing a background mitigation read of a second physical page in the first page group in the first block.

19. The data storage system of claim 17, wherein repetitively performing background mitigation reads comprises the controller performing a background mitigation read directed to each of the plurality of blocks within a predetermined time period.

20. The data storage system of claim 17, wherein repetitively performing background mitigation reads comprises:
in a given cycle of performing background mitigation reads to all page groups, the controller performing background mitigation reads of only a subset of physical pages in each page group.

* * * * *